US012646819B2

(12) United States Patent
Kim et al.

(10) Patent No.: US 12,646,819 B2
(45) Date of Patent: Jun. 2, 2026

(54) FEED PIN, AND PATCH ANTENNA COMPRISING SAME

(71) Applicant: AMOTECH CO., LTD., Incheon (KR)

(72) Inventors: Taehyung Kim, Incheon (KR); Chul Huang, Incheon (KR); Yechan Choi, Incheon (KR); Sanghyun Lee, Incheon (KR); Habin Bong, Incheon (KR); Sango Kim, Incheon (KR); Seungho Yang, Incheon (KR); Gunyoung Lee, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 88 days.

(21) Appl. No.: 18/703,307

(22) PCT Filed: Oct. 7, 2022

(86) PCT No.: PCT/KR2022/015205
§ 371 (c)(1),
(2) Date: Apr. 19, 2024

(87) PCT Pub. No.: WO2023/068617
PCT Pub. Date: Apr. 27, 2023

(65) Prior Publication Data

US 2024/0413518 A1 Dec. 12, 2024

(30) Foreign Application Priority Data

Oct. 20, 2021 (KR) ........................ 10-2021-0140296

(51) Int. Cl.
*H01Q 1/22* (2006.01)
*H01Q 1/46* (2006.01)
*H01Q 9/04* (2006.01)

(52) U.S. Cl.
CPC ................. *H01Q 1/22* (2013.01); *H01Q 1/46* (2013.01); *H01Q 9/0414* (2013.01)

(58) Field of Classification Search
CPC .......... H01Q 1/22; H01Q 1/46; H01Q 9/0414; H01Q 1/3233; H01Q 9/0428; H01Q 9/045; H01Q 9/0407
See application file for complete search history.

(56) References Cited

U.S. PATENT DOCUMENTS

2004/0095279 A1* 5/2004 Shikata ................ H01Q 9/0407 343/700 MS
2008/0055161 A1* 3/2008 Noro .................... H01Q 9/0407 343/700 MS (Continued)

FOREIGN PATENT DOCUMENTS

CN 1175506 A * 3/1998 ............ B41J 2/1626
JP H08-116210 A 5/1996

(Continued)

OTHER PUBLICATIONS

KR Office Action dated Jul. 10, 2023 as received in Application No. 10-2021-0140296.

(Continued)

*Primary Examiner* — Jason M Crawford
*Assistant Examiner* — Jose A. Miranda Gonzalez
(74) *Attorney, Agent, or Firm* — Maschoff Brennan

(57) ABSTRACT

Provided are: a feed pin in which a step is formed on a head to prevent cracks from forming in a soldering layer; and a patch antenna comprising the feed pin. The provided feed pin includes: a feed head made of a conductive material and in the shape of a plate having a first area; a stepped plate made of a conductive material and in the shape of a plate having a second area, the stepped plate being connected to the lower surface of the feed head; and a feed bar made of a conductive material and in the shape of a polyhedron, the feed bar being connected to the lower surface of the stepped plate.

11 Claims, 12 Drawing Sheets

(56) References Cited

U.S. PATENT DOCUMENTS

| | | | | |
|---|---|---|---|---|
| 2011/0260928 | A1* | 10/2011 | Ito | H01Q 9/045 29/601 |
| 2012/0127037 | A1* | 5/2012 | Fujiwara | H01Q 9/045 343/700 MS |
| 2018/0090843 | A1* | 3/2018 | Anderson | H01Q 9/0457 |
| 2020/0136257 | A1* | 4/2020 | Hwang | H01Q 1/3275 |

FOREIGN PATENT DOCUMENTS

| | | | | |
|---|---|---|---|---|
| JP | H09-008537 | A | | 1/1997 |
| JP | H098537 | A | * | 1/1997 |
| JP | H09-260933 | A | | 10/1997 |
| JP | 2002-344230 | A | | 11/2002 |
| JP | 2002-353730 | A | | 12/2002 |
| KR | 10-0464863 | B1 | | 1/2005 |
| KR | 10-2011-0011537 | A | | 2/2011 |
| KR | 20110011537 | A | * | 2/2011 |
| KR | 10-2021-0025457 | A | | 3/2021 |

OTHER PUBLICATIONS

KR Decision to Grant Dated Jan. 11, 2024 as received in Application No. 10-2021-0140296.

Extended European Search Report dated Jan. 22, 2025 as received in Application No. 22883840.5.

* cited by examiner

[FIG. 1]
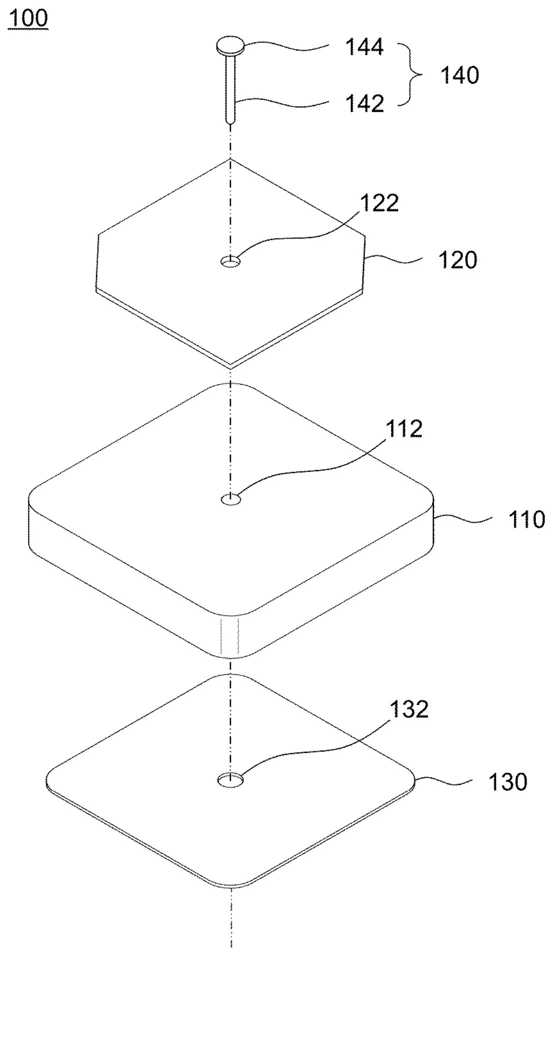

[FIG. 2]
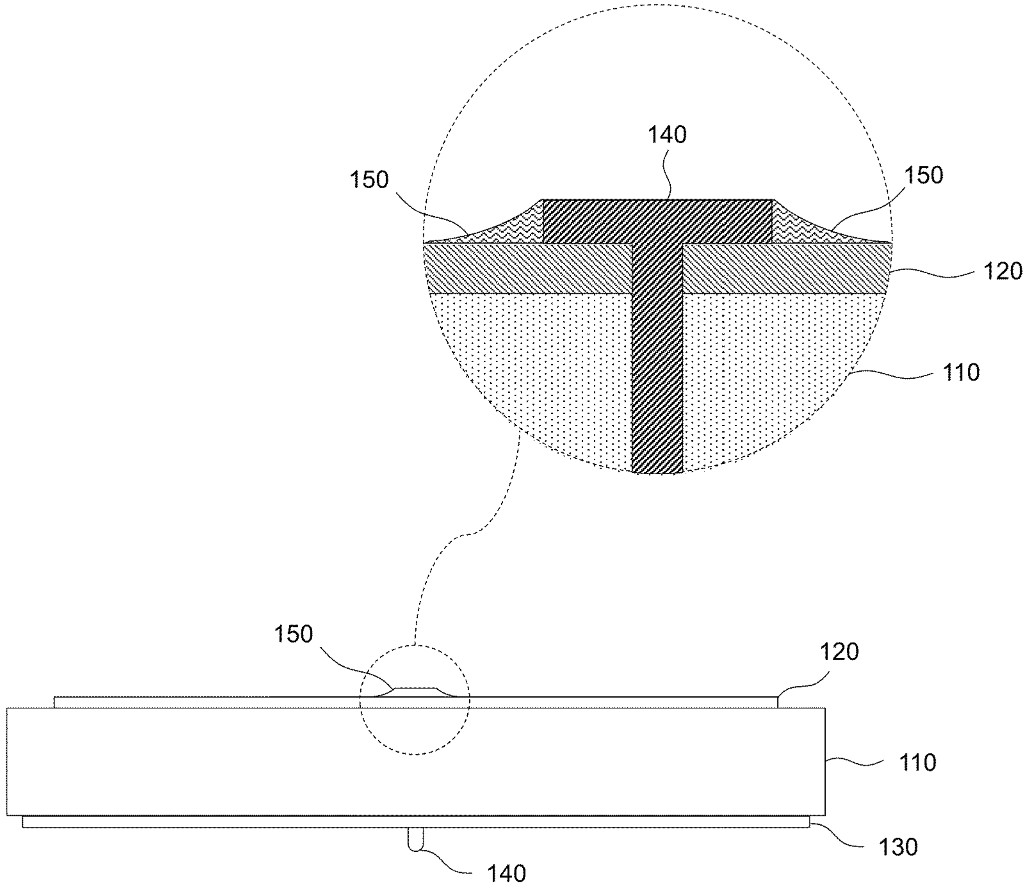
[FIG. 3]
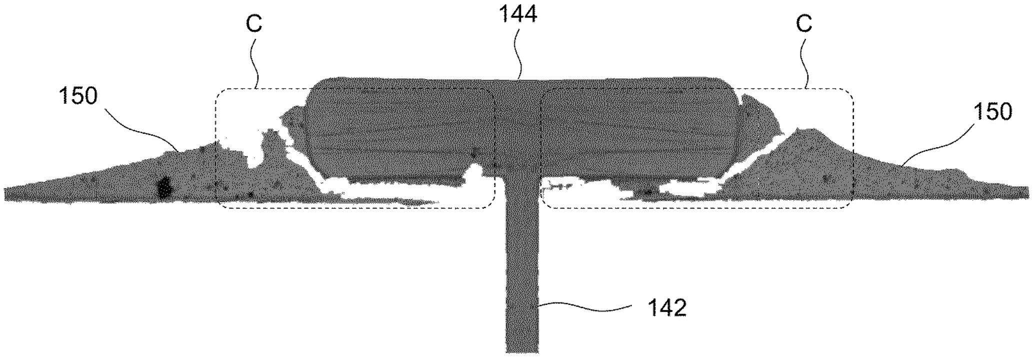

[FIG. 4]
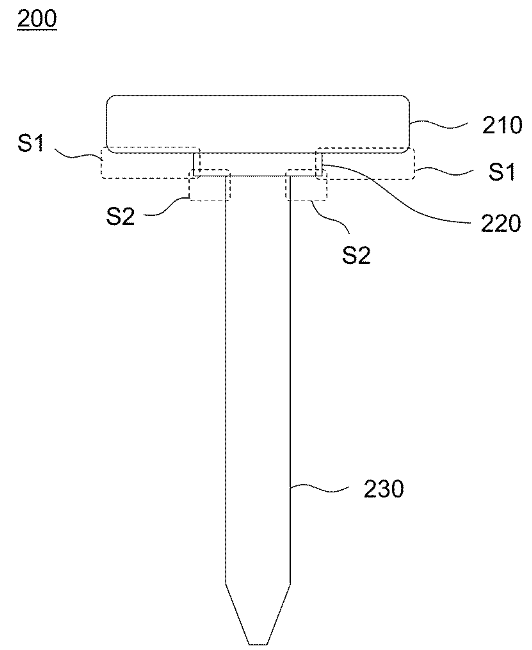
[FIG. 5]
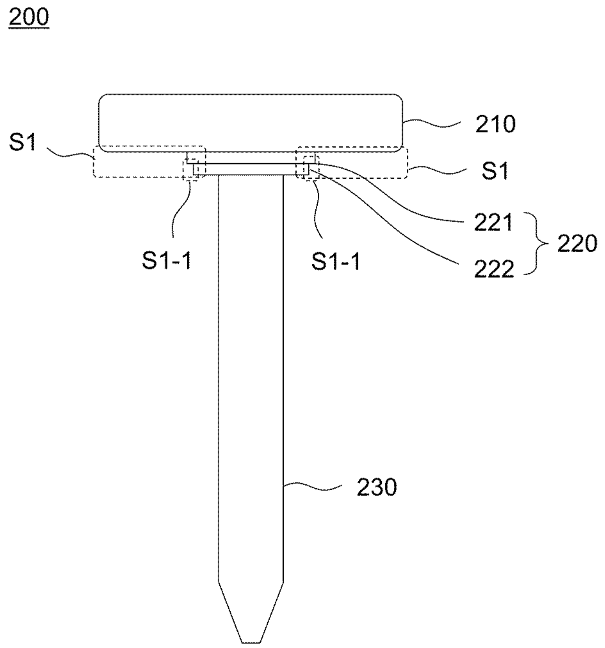

[FIG. 6]
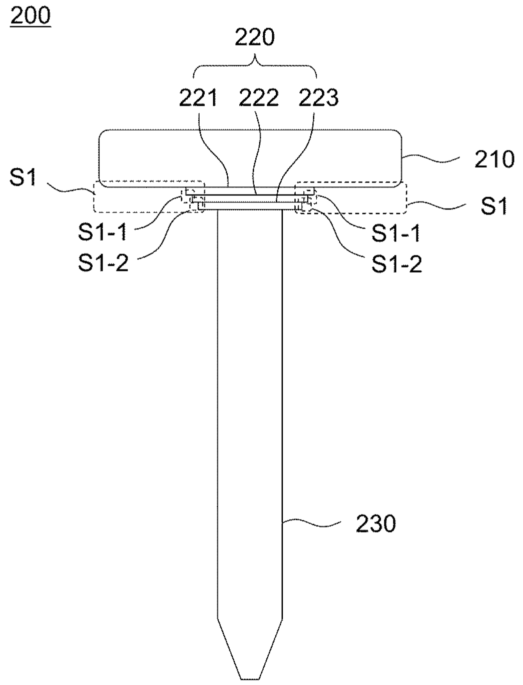
[FIG. 7]
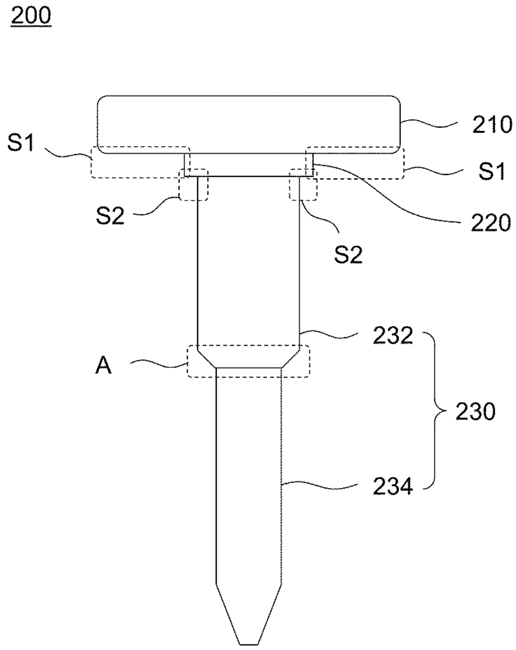

[FIG. 8]
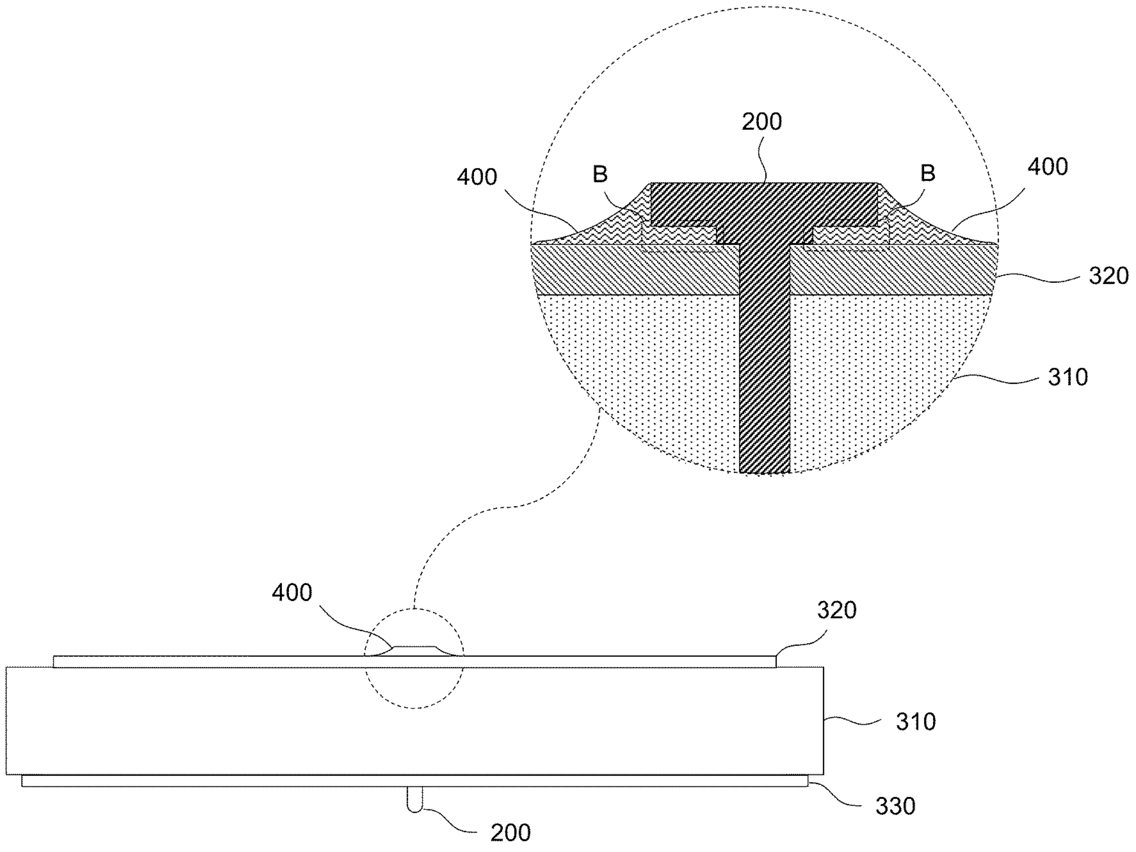

[FIG. 9]
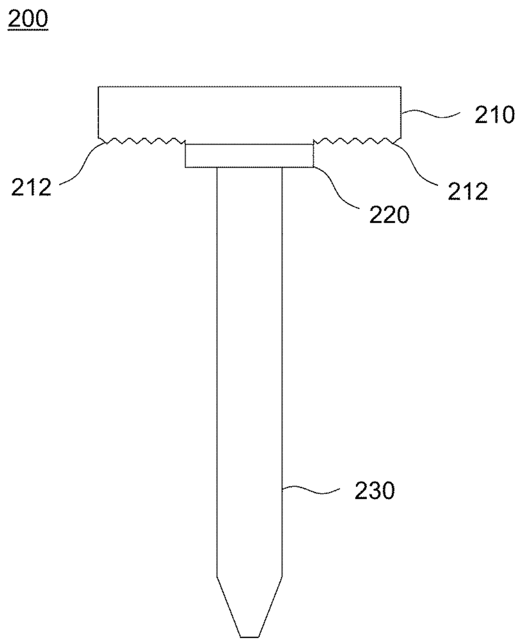
[FIG. 10]
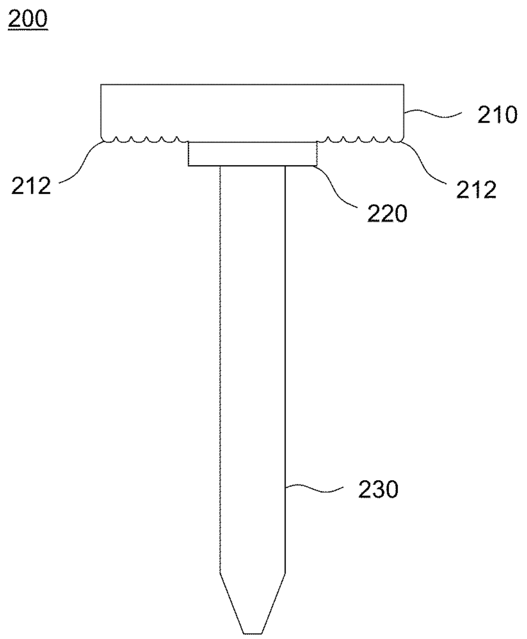

[FIG. 11]
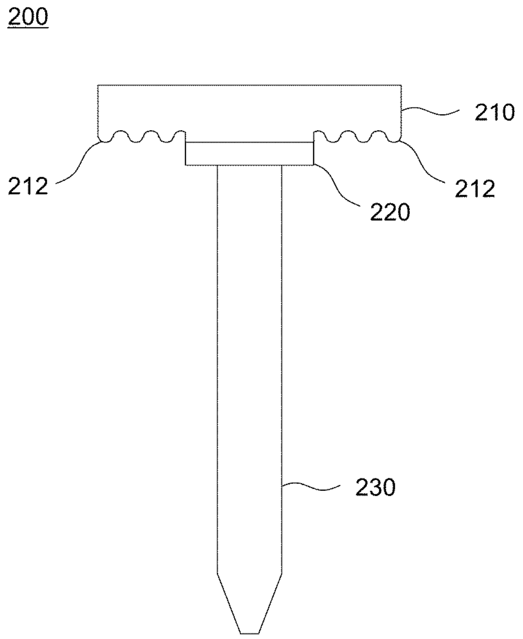
[FIG. 12]
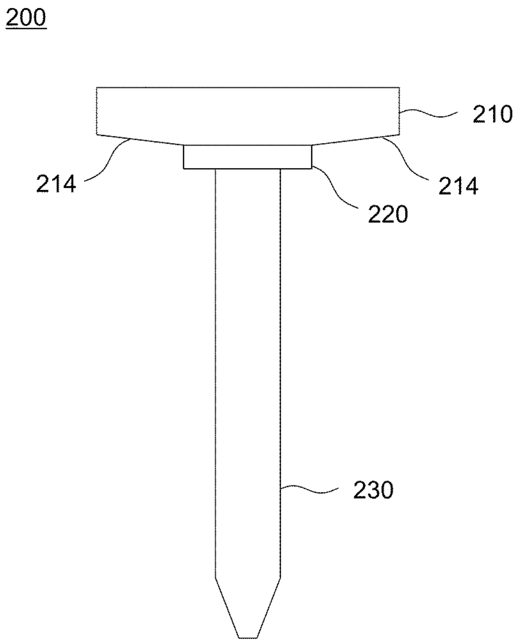

[FIG. 13]
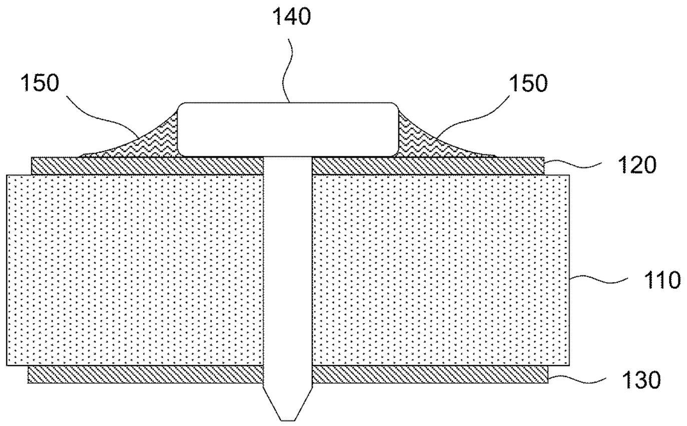

[FIG. 14]

| ROUND | 1 | 2 | 3 | 4 | 5 | 6 | 7 | 8 | 9 | 10 |
|---|---|---|---|---|---|---|---|---|---|---|
| BONDING STRENGTH | 9.8 | 10.8 | 9.4 | 9 | 9.6 | 9.6 | 10.8 | 10 | 9 | 11 |
| ROUND | 11 | 12 | 13 | 14 | 15 | 16 | 17 | 18 | 19 | 20 |
| BONDING STRENGTH | 10.2 | 16 | 13.4 | 11.6 | 10.4 | 14.6 | 13.2 | 15.2 | 9.4 | 9.4 |
| ROUND | 21 | 22 | 23 | 24 | 25 | 26 | 27 | 28 | 29 | 30 |
| BONDING STRENGTH | 12.4 | 12.2 | 9.6 | 9.2 | 11.6 | 11.2 | 10 | 10.4 | 14.6 | 11.8 |
| ROUND | 31 | 32 | 33 | 34 | 35 | 36 | 37 | 38 | 39 | 40 |
| BONDING STRENGTH | 10.4 | 13.4 | 15 | 13.4 | 14.6 | 15 | 12.4 | 9.6 | 10.2 | 13 |

| | | | | | | | |
|---|---|---|---|---|---|---|---|
| MINIMUM STRENGTH | 9 | MAXIMUM STRENGTH | 16 | DIFFERENCE | 7 | AVERAGE | 11.56 |

[FIG. 15]
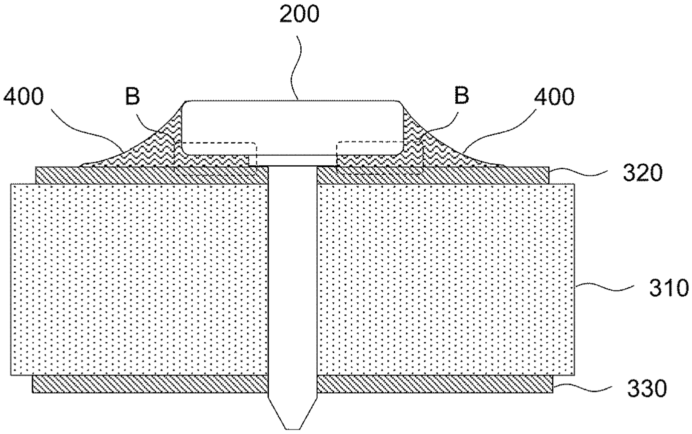

[FIG. 16]

| | | | | | | | | | | |
|---|---|---|---|---|---|---|---|---|---|---|
| ROUND | 1 | 2 | 3 | 4 | 5 | 6 | 7 | 8 | 9 | 10 |
| BONDING STRENGTH | 16 | 17 | 20 | 16 | 17 | 18 | 18 | 19 | 20 | 18 |
| ROUND | 11 | 12 | 13 | 14 | 15 | 16 | 17 | 18 | 19 | 20 |
| BONDING STRENGTH | 20 | 20 | 16.5 | 18 | 18 | 17 | 13 | 19 | 19 | 20 |
| ROUND | 21 | 22 | 23 | 24 | 25 | 26 | 27 | 28 | 29 | 30 |
| BONDING STRENGTH | 20 | 16 | 20 | 20 | 18 | 18.5 | 18 | 20 | 18 | 19 |
| ROUND | 31 | 32 | 33 | 34 | 35 | 36 | 37 | 38 | 39 | 40 |
| BONDING STRENGTH | 19 | 18 | 18 | 19.5 | 18 | 19 | 18 | 18 | 19.5 | 17 |

| | | | | | | | |
|---|---|---|---|---|---|---|---|
| MINIMUM STRENGTH | 13 | MAXIMUM STRENGTH | 20 | DIFFERENCE | 7 | AVERAGE | 18.3 |

[FIG. 17]
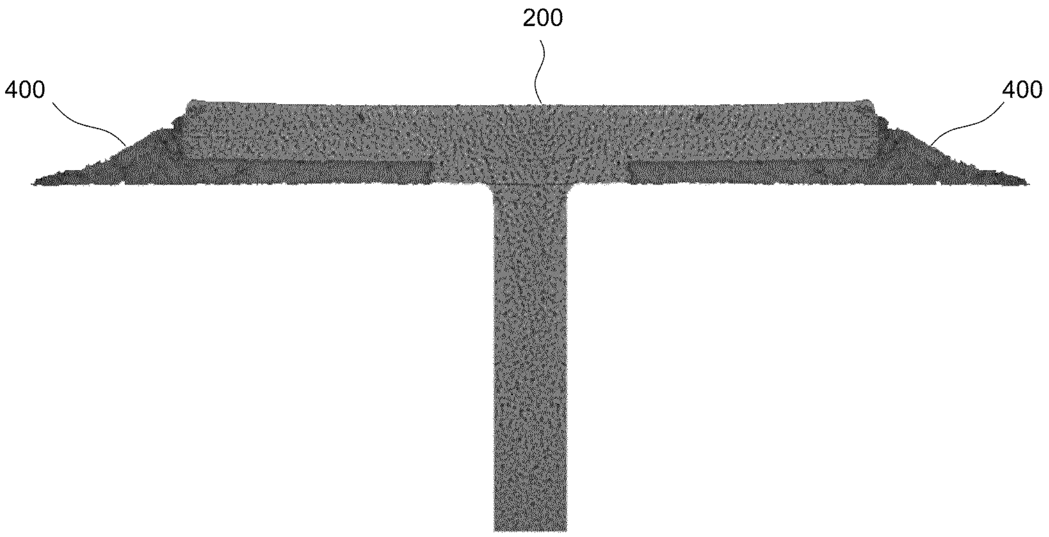

FEED PIN, AND PATCH ANTENNA COMPRISING SAME

TECHNICAL FIELD

The present disclosure relates to a feed pin for feeding a patch antenna mounted in a vehicle or the like, and the patch antenna including the same.

BACKGROUND ART

Generally, patch antennas are installed in vehicles, drones, and information and communication terminals to transmit and receive signals in frequency bands, such as a global positioning system (GPS) and a global navigation satellite system (GNSS).

A patch antenna includes a dielectric formed in a predetermined thickness, a planar upper patch laminated on an upper surface of the dielectric and acts as an antenna, a lower patch laminated on a lower surface of the dielectric, and a feed pin for feeding the upper patch. Here, since the dielectric mainly uses ceramic, which is widely used as a high-frequency component due to the excellent characteristics, such as a high dielectric constant and a low thermal expansion coefficient, the patch antenna is also referred to as a ceramic patch antenna.

The upper patch and the lower patch are formed in various shapes, such as a quadrangular, circular, elliptical, triangular, or ring shape, but a quadrangular or circular shape is mainly used. In this case, the upper patch and the lower patch are made of a conductive material with a high conductivity with the ceramic dielectric. Structures of the upper patch and the lower patch include a multilayer, a bulk type, and the like. The feed pin is electrically connected to the upper patch through soldering to feed the upper patch.

However, the patch antenna has a problem in that a corrosion phenomenon occurs in a soldering layer due to the reaction between lead and oxygen as high or low temperatures are repeated during an electrical reliability test (i.e., an electrical thermal impact test) for vehicle installation.

In addition, the patch antenna has a problem in that micro cracks easily occur even with a small amount of stress (impact) due to the corrosion phenomenon in a soldering area, and the characteristics of the patch antenna are changed due to the micro cracks, thereby degrading reliability.

Matters described above in the background art are intended to help understanding of the background of the disclosure and may include matters not related to the known related art.

SUMMARY OF INVENTION

Technical Problem

The present disclosure has been proposed to solve the problems and is directed to providing a feed pin that prevents cracks occurring in a soldering layer by forming a step on a head, and a patch antenna including the same.

Solution to Problem

To achieve the object, a feed pin according to an embodiment of the present disclosure includes a feed head made of a plate-shaped conductive material with a first area, a stepped plate made of a plate-shaped conductive material having a second area and connected to a lower surface of the feed head, and a feed bar made of a polyhedral conductive material and connected to a lower surface of the stepped plate.

The second area that is an area of a horizontal cross section of the stepped plate may be formed to be smaller than the first area that is a horizontal cross section of the feed head, and a first step may be formed between the feed head and the stepped plate. The first step may be formed along the lower surface of the feed head and outer perimeters of side surfaces of the stepped plate.

The stepped plate may be formed by laminating a plurality of plate-shaped conductors formed to have different horizontal cross-sectional areas, and one or more steps may be formed on side surfaces of the stepped plate. Therefore, a first step formed between the feed head and the stepped plate may include two or more steps.

In the feed pin according to the embodiment of the present disclosure, a third area that is an area of a horizontal cross section of the feed bar may be formed to be smaller than the second area that is a horizontal cross section of the stepped plate, and a second step may be formed between the stepped plate and the feed bar.

A first area connected to the feed bar and a second area that is an outer perimetric area of the first area may be defined on the lower surface of the stepped plate, and a plurality of bonding protrusions may be formed in the second area.

A first area connected to the feed bar and a second area that is an outer perimetric area of the first area may be defined on the lower surface of the stepped plate, and an inclined portion having inclination closer to an upper surface of the feed head toward an outer perimeter of the feed head may be formed in the second area.

The feed bar may include a first bar disposed on the lower surface of the stepped plate, and a second bar disposed on a lower surface of the first bar, and the second bar may be formed to have a horizontal cross section smaller than a horizontal cross section of the first bar to form a locking stopper.

To achieve the object, a patch antenna according to an embodiment of the present disclosure includes a dielectric layer, an upper patch disposed on an upper surface of the dielectric layer, a lower patch disposed on a lower surface of the dielectric layer, and a feed pin passing through the upper patch, the dielectric layer, and the lower patch to feed the upper patch, wherein the feed bar includes a feed head made of a plate-shaped conductive material with a first area, a stepped plate made of a plate-shaped conductive material having a second area and connected to a lower surface of the feed head, and a feed bar made of a polyhedral conductive material and connected to a lower surface of the stepped plate.

A bonding space surrounded by a lower surface of the feed head, an outer perimeter of the stepped plate, and an upper surface of the upper patch is defined in the patch antenna according to the embodiment of the present disclosure, and a soldering layer may be formed in the bonding space.

In the patch antenna according to the embodiment of the present disclosure, the second area that is an area of a horizontal cross section of the stepped plate may be formed to be smaller than the first area that is a horizontal cross section of the feed head, and a first step is formed between the feed head and the stepped plate, and a soldering layer may be formed in a bonding space formed by the first step and an upper surface of the upper patch.

A first area connected to the feed bar and a second area that is an outer perimetric area of the first area may be defined on the lower surface of the stepped plate, and a plurality of bonding protrusions may be formed in the second area.

A first area connected to the feed bar and a second area that is an outer perimetric area of the first area may be defined on the lower surface of the stepped plate, an inclined portion having inclination closer to an upper surface of the feed head toward an outer perimeter of the feed head may be formed in the second area, and a soldering layer may be formed in a bonding space formed by the inclined portion and an upper surface of the upper patch.

The patch antenna according to the embodiment of the present disclosure may further include a first soldering layer formed in a bonding space surrounded by a lower surface of the feed head, an outer perimeter of the stepped plate, and an upper surface of the upper patch, and a second soldering layer formed in a bonding space formed by the upper surface of the upper patch and an outer perimeter of the feed head.

Meanwhile, the stepped plate may be formed by laminating a plurality of plate-shaped conductors formed to have different horizontal cross-sectional areas, and one or more steps may be formed on side surfaces of the stepped plate.

Advantageous Effects of Invention

According to the present disclosure, the feed pin and the patch antenna including the same can increase the area in which the feed head is in contact with the soldering layer by forming the first step between the feed head and the feed bar, thereby increasing the bonding strength compared to the general feed pins.

In addition, the feed pin and the patch antenna including the same can maintain the bonding strength at the predetermined level even in the electrical reliability test (i.e., electrical thermal impact test) in which high and low temperatures are repeated by increasing the bonding strength compared to the conventional feed pin, thereby preventing the occurrence of cracks.

BRIEF DESCRIPTION OF DRAWINGS

FIG. 1 is a view for describing a patch antenna to which a feed pin according to an embodiment of the present disclosure is applied.

FIGS. 2 and 3 are views for describing a conventional feed pin and a patch antenna including the same.

FIG. 4 is a view for describing the feed pin according to the embodiment of the present disclosure.

FIGS. 5 to 7 are views for describing a modified example of the feed pin according to the embodiment of the present disclosure.

FIG. 8 is a view for describing a patch antenna including the feed pin according to the embodiment of the present disclosure.

FIGS. 9 to 12 are views for describing the modified example of the feed pin according to the embodiment of the present disclosure.

FIGS. 13 and 14 are views for describing a soldering shape and bonding strength of a general feed pin.

FIGS. 15 and 16 are views for describing a soldering shape and bonding strength of the feed pin according to the embodiment of the present disclosure.

FIG. 17 is a view showing a fragment of the patch antenna to which the feed pin according to the embodiment of the present disclosure is applied after an electrical reliability test (i.e., an electrical thermal impact test).

DESCRIPTION OF EMBODIMENTS

Hereinafter, exemplary embodiments according to the present disclosure will be described in detail with reference to the accompanying drawings.

The embodiments are provided to more completely describe the present disclosure to those skilled in the art, and the following embodiments may be modified in various different forms, and the scope of the present disclosure is limited to the following embodiments. Rather, the embodiments are provided to make the disclosure more faithful and complete and fully convey the spirit of the present disclosure.

Terms used herein are intended to describe specific embodiments and are not intended to limit the present disclosure. In addition, in the present specification, singular forms may include plural forms unless the context clearly indicates otherwise.

In the description of the embodiment, when each layer (film), area, pattern, or structure is described as being formed "on" or "under" a substrate, each layer (film), area, pad, or patterns, "on" and "under" include both cases of being formed "directly" or "indirectly with other elements interposed therebetween." In addition, in principle, the reference for "above" or "under" each layer are based on the drawing.

The drawings are only intended to help understanding of the spirit of the present disclosure and should not be construed as limiting the scope of the present disclosure by the drawings. In addition, in the drawings, a relative thickness and length, or a relative size may be exaggerated for convenience and clarity of description.

Referring to FIG. 1, a general patch antenna 100 includes a base substrate 110, an upper patch 120 disposed above the base substrate 110, a lower patch 130 disposed under the base substrate 110, and a feed pin 140 for feeding the upper patch 120.

The base substrate 110 is made of a dielectric or a magnetic material that has a dielectric constant. The base substrate 110 may be formed as a dielectric substrate made of ceramic with characteristics, such as a high dielectric constant and a low thermal expansion coefficient. The base substrate 110 may be formed as a magnetic substrate made of a magnetic material such as ferrite.

In this case, a first through hole 112 through which the feed pin 140 passes is formed in the base substrate 110, and the first through hole 112 is formed to pass through the base substrate 110 from the top to the bottom.

The upper patch 120 is disposed above the base substrate 110. The upper patch 120 is formed of a thin plate made of a conductive material with high electrical conductivity, such as copper, aluminum, gold, or silver.

In this case, a second through hole 122 through which the feed pin 140 passes is formed in the upper patch 120, and the second through hole 122 is formed to pass through the upper patch 120 from the top to the bottom. The second through hole 122 overlaps the first through hole 112 as the upper patch 120 is fixedly disposed above the base substrate 110.

The upper patch 120 is fed through the feed pin 140 to operate as a radiator for receiving GPS signals, GLONASS signals, and the like.

The lower patch 130 is disposed on a lower surface of the base substrate 110. In other words, the lower patch 130 is formed of a thin plate made of a conductive material with high electrical conductivity, such as copper, aluminum, gold, or silver. The lower patch 130 is formed to have a smaller area than the lower surface of the base substrate 110 and formed to have a larger area than the upper patch 120. In this case, the lower patch 130 needs to secure a predetermined area or more to form a ground and may be formed on the entirety of the lower surface of the dielectric to secure the area.

In this case, a third through hole 132 through which the feed pin 140 passes is formed in the lower patch 130, and the third through hole 132 is formed to pass through the upper patch 120 from the top to the bottom. The third through hole 132 overlaps the first through hole 112 and the second through hole 122 as the upper patch 120 is fixedly disposed under the base substrate 110.

As the base substrate 110, the upper patch 120, and the lower patch 130 are laminated, the first through hole 112, the second through hole 122, and the third through hole 132 are aligned to form a through path through which the feed pin 140 passes.

The feed pin 140 includes a feed bar 142 and a feed head 144 connected to a first end portion of the feed bar 142. A second end portion of the feed bar 142 of the feed pin 140 sequentially passes through the upper patch 120, the base substrate 110, and the lower patch 130. Therefore, the feed bar 142 is disposed in the through path, and the feed head 144 is disposed on an upper surface of the upper patch 120.

Referring to FIG. 2, the conventional feed pin 140 is attached to the patch antenna 100 through soldering. In this case, a soldering layer is formed along a side surface of the feed head 144, and the soldering layer 150 bonds the feed pin 140 and the patch antenna 100. Of course, the soldering layer 150 may also be formed above the feed head 144.

Referring to FIG. 3, in the conventional feed pin 140, the corrosion phenomenon occurs due to the reaction of lead and oxygen in the soldering layer 150 as high and low temperatures are repeated upon an electrical reliability test (i.e., an electrical thermal impact test) of the patch antenna 100.

In addition, micro cracks easily occur in the conventional feed pin 140 even with a small amount of stress (impact) due to the corrosion phenomenon of the soldering layer 150, and the characteristics of the patch antenna 100 are changed by the micro cracks, thereby degrading reliability.

Therefore, the feed pin (hereinafter referred to as "feed pin") according to the embodiment of the present disclosure forms a first step between the feed head and the feed bar. The feed pin increases a contact area between the feed head and the soldering layer 150 by forming the first step, thereby increasing the bonding strength.

The feed pin according to the embodiment of the present disclosure may increase the bonding strength compared to the conventional feed pin, thereby maintaining a bonding strength at a predetermined level even in the electrical reliability test in which high and low temperatures are repeated.

In addition, compared to the conventional feed pin, the feed pin according to the embodiment of the present disclosure can maintain the bonding strength at the predetermined strength or more even in the electrical reliability test, thereby preventing the occurrence of the corrosion phenomenon and micro cracks in the soldering layer 150 during the electrical reliability test.

Referring to FIG. 4, the feed pin 200 according to the embodiment of the present disclosure includes a feed head 210, a stepped plate 220, and a feed bar 230. Hereinafter, to easily describe the embodiment of the present disclosure, the feed bar 230, the head 210, and the stepped plate 220 are described separately, but are not limited thereto and may be formed integrally.

The feed head 210 is made of a conductive material. The feed head 210 is made of a plate-shaped conductive material. For example, the feed head 210 is formed in a plate shape having an upper surface, a lower surface, and one or more side surfaces. In this case, the feed head 210 is formed to have a thickness (height) of about 2 mm or more and 2.5 mm or less.

A lower surface of the feed head 210 may be formed in a polygonal, circular, elliptical shape, or the like that has a first area. An upper surface of the feed head 210 may have the same first area as the lower surface of the feed head 210 and may be formed in the same shape as the lower surface of the feed head 210. The upper surface of the feed head 210 may have the same first area as the lower surface of the feed head 210 and may be formed in a different shape from the lower surface of the feed head 210. The upper surface of the feed head 210 may have a different area from the lower surface of the feed head 210 and may be formed in the same shape as the lower surface of the feed head 210. The upper surface of the feed head 210 may have a different area from the lower surface of the feed head 210 and may be formed in a different shape from the lower surface of the feed head 210.

A first area connected (in contact) with the stepped plate 220 and a second area not connected (not in contact) with the stepped plate 220 may be defined on the lower surface of the feed head 210. The first area may be defined to include a center point of the lower surface of the feed head 210, and the second area may be defined to surround the first area of the lower surface of the feed head 210.

The stepped plate 220 is made of a conductive material. For example, the stepped plate 220 is formed in a plate shape having an upper surface, a lower surface, and one or more side surfaces. In this case, the stepped plate 220 is formed to have a thickness (height) of about 0.05 mm or more and 0.5 mm or less depending on the thickness (height) of the feed head 210.

An upper surface of the stepped plate 220 may be formed in a polygonal, circular, elliptical shape, or the like that has the second area smaller than the first area (i.e., the lower surface of the feed head 210). A lower surface of the stepped plate 220 may have the same second area as the upper surface of the stepped plate 220 and may be formed in the same shape as the upper surface of the stepped plate 220. The lower surface of the stepped plate 220 may have the second area equal to that of the upper surface of the stepped plate 220 and may be formed in a different shape from the upper surface of the stepped plate 220. The lower surface of the stepped plate 220 may have a different area from the upper surface of the stepped plate 220 and may be formed in the same shape as the upper surface of the stepped plate 220. The lower surface of the stepped plate 220 may have a different area from the upper surface of the stepped plate 220 and may be formed in a different shape from the upper surface of the stepped plate 220.

Meanwhile, the stepped plate 220 may be formed by laminating the plurality of plate-shaped conductors. In this case, horizontal cross sections of the plurality of plate-shaped conductors may be formed to have different areas, and one or more steps may be formed on the side surfaces of the stepped plate 220.

Referring to FIG. 5, the stepped plate 220 is formed by laminating a first plate-shaped conductor 221 and a second plate-shaped conductor 222.

The first plate-shaped conductor 221 is interposed between the feed head 210 and the second plate-shaped conductor 222. In this case, an upper surface of the first plate-shaped conductor 221 may be formed in a polygonal, circular, elliptical shape, or the like that has a 2-1 area smaller than the first area.

The second plate-shaped conductor 222 is interposed between the first plate-shaped conductor 221 and the feed bar 230. In this case, an upper surface of the second plate-shaped conductor 222 may be formed in a polygonal, circular, elliptical shape, or the like that has a 2-2 area smaller than the 2-1 area.

The stepped plate 220 is formed with a 1-1 step S1-1 as the second plate-shaped conductor 222 is formed to have a smaller area than the first plate-shaped conductor 221. The 1-1 step S1-1 is formed along outer perimeters of side surfaces of the second plate-shaped conductor 222.

Referring to FIG. 6, the stepped plate 220 may be formed by laminating the first plate-shaped conductor 221, the second plate-shaped conductor 222, and the third plate-shaped conductor 223.

The first plate-shaped conductor 221 is interposed between the feed head 210 and the second plate-shaped conductor 222. In this case, an upper surface of the first plate-shaped conductor 221 may be formed in a polygonal, circular, elliptical shape, or the like that has a 2-1 area smaller than the first area.

The second plate-shaped conductor 222 is interposed between the first plate-shaped conductor 221 and the third plate-shaped conductor 223. In this case, an upper surface of the second plate-shaped conductor 222 may be formed in a polygonal, circular, elliptical shape, or the like that has a 2-2 area smaller than the 2-1 area.

The third plate-shaped conductor 223 is interposed between the second plate-shaped conductor 222 and the feed bar 230. In this case, an upper surface of the third plate-shaped conductor 223 may be formed in a polygonal, circular, elliptical shape, or the like that has a 2-3 area smaller than the 2-2 area.

Since the stepped plate 220 is formed by laminating the plate-shaped conductors 221, 222, and 223 having different areas, a 1-1 step S1-1 and a 1-2 step S1-2 are formed. The 1-1 step S1-1 is formed along the outer perimeters of the side surfaces of the second plate-shaped conductor 222, and the 1-2 step S1-2 is formed along outer perimeters of side surfaces of the third plate-shaped conductor 223.

In FIGS. 5 and 6, although the example in which the stepped plate 220 is formed by laminating two or three plate-shaped conductors has been described, the present disclosure is not limited thereto and may be formed by laminating four or more plate-shaped conductors. In this case, three or more steps may be formed on the outer perimeter of the stepped plate 220.

The feed bar 230 is made of a conductive material. In the drawing, the feed bar 230 is formed as a polyhedron of which vertical length is larger than a horizontal length. As an example, the feed bar 230 is made of a cylindrical conductive material.

The feed bar 230 is disposed under the stepped plate 220. The first end portion of the feed bar 230 is connected to the lower surface of the stepped plate 220. The first end portion of the feed bar 230 is connected to the first area defined on the lower surface of the stepped plate 220.

The second end portion of the feed bar 230 sequentially passes through the upper patch 320, the base substrate 310, and the lower patch 330.

In this case, the second end portion of the feed bar 230 may pass through the patch antenna 300 and then be exposed downward from the patch antenna 300. Here, as an example, the first end portion of the feed bar 230 is an end portion located at the top in the drawing, and the second end portion of the feed bar 230 is an end portion located at the bottom in the drawing.

Referring to FIG. 7, the feed bar 230 may include a first bar 232 and a second bar 234 to prevent the feed pin 200 from sagging when the feed pin 200 is inserted into the patch antenna 300 and more firmly fixing the feed pin 200 to the patch antenna 300.

Since the feed pin 200 according to the embodiment of the present disclosure is formed to have a horizontal cross section of the second bar 234 smaller than a horizontal cross section of the first bar 232, it is possible to prevent the feed pin 200 from sagging when a locking stopper A is formed inside the dielectric of the patch antenna 300 to insert the feed pin 200 into the patch antenna 300 and more firmly fix the feed pin 200 to the patch antenna 300.

In the drawing, the first bar 232 is formed as a polyhedron of which vertical length is larger than a horizontal length. As an example, the first bar 232 is made of a cylindrical conductive material. The first bar 232 is interposed between the stepped plate 220 and the second bar 234. The horizontal cross section of the first bar 232 is formed to have a fourth area.

In the drawing, the second bar 234 is formed as a polyhedron of which vertical length is larger than a horizontal length. As an example, the second bar 234 is made of a cylindrical conductive material. The second bar 234 is disposed under the first bar 232. The horizontal cross section of the second bar 234 is formed to have a fifth area smaller than the fourth area.

Since the feed pin 200 according to the embodiment of the present disclosure is formed to have the upper surface of the stepped plate 220 smaller than the lower surface of the feed head 210, a first step S1 is formed between the feed head 210 and the stepped plate 220. The first step S1 is formed along the outer perimeters of the side surfaces of the stepped plate 220.

In this case, when the stepped plate 220 is formed of a plurality of plate-shaped conductors, the feed pin 200 may be formed with the first step S1 formed of a plurality of steps including one or more steps (i.e., a 1-1 step S1-1 and a 1-2 step S-2) formed on the stepped plate 220.

In addition, since the feed pin 200 according to the embodiment of the present disclosure is formed to have a third area in which the cross section of the feed bar 230 is smaller than the lower surface of the stepped plate 220, a second step S2 is formed between the stepped plate 220 and the feed bar 230. The second step S2 is formed along the outer perimeters of the side surfaces of the feed bar 230.

Referring to FIG. 8, the patch antenna 300 to which the feed pin 200 according to the embodiment of the present disclosure is formed with a bonding space B surrounded by the lower surface of the feed head 210, the outer perimeter of the stepped plate 220, and the upper surface of the upper patch 320.

The feed pin 200 according to the embodiment of the present disclosure may be formed with the bonding space B greater than that of the conventional patch antenna 100 between the lower surface of the feed head 210 and the upper patch 320, and in the soldering process, the soldering layer 400 may also be formed in the bonding space B, thereby increasing the bonding strength of the feed pin 200 compared to the conventional feed pin 140.

Referring to FIGS. 9 and 10, various types of bonding protrusions 212 for increasing the bonding strength may be formed on the lower surface of the feed head 210. The bonding protrusion 212 is formed in the second area defined on the lower surface of the feed head 210.

Referring to FIG. 9, a plurality of bonding protrusions 212 having a triangular vertical cross section may be formed on the lower surface of the feed head 210. For example, the bonding protrusions 212 are formed in a cone shape and are disposed in a row in the second area of the lower surface of the feed head 210.

Referring to FIG. 10, a plurality of bonding protrusions 212 having a semicircular vertical cross section may be formed on the lower surface of the feed head 210. For example, the bonding protrusions 212 are formed in a hemispherical shape and are disposed in a row in the second area of the lower surface of the feed head 210.

Meanwhile, referring to FIG. 11, various types of bonding protrusions 212 and bonding grooves for increasing the bonding strength may be formed on the lower surface of the feed head 210. The bonding protrusions 212 and the bonding grooves are formed in the second area defined on the lower surface of the feed head 210.

For example, the plurality of bonding protrusions 212 and bonding grooves having a semicircular vertical cross section may be formed on the lower surface of the feed head 210. The bonding protrusions 212 and the bonding grooves are formed in a hemispherical shape and are alternately disposed in the second area of the lower surface of the feed head 210.

As described above, the feed pin 200 according to the embodiment of the present disclosure may be formed to have the bonding protrusions 212 and/or bonding grooves on the lower surface of the feed head 210 to increase the contact area between the soldering layer 400 formed in the soldering process and the lower surface of the feed head 210, thereby increasing the bonding strength of the feed pin 200.

Referring to FIG. 12, an inclined portion 214 for increasing the bonding strength may be formed on the lower surface of the feed head 210. In this case, when the inclined portion 214 has an inclination closer to the upper surface of the feed head 210 toward the outer perimeter of the feed head 210, the soldering layer 400 may not be formed between the lower surface of the feed head 210 and the upper patch 320 in the soldering process. Therefore, the inclined portion 214 having the inclination closer to the upper surface of the feed head 210 toward the outer perimeter of the feed head 210 is formed.

As described above, the feed pin 200 according to the embodiment of the present disclosure may have the step formed by interposing the stepped plate 220 between the feed head 210 and the feed bar 230 to increase the contact area between the soldering layer 400 formed in the soldering process and the lower surface of the feed head 210, thereby increasing the bonding strength compared to the conventional feed pin 140.

In addition, the feed pin 200 according to the embodiment of the present disclosure may have the plurality of bonding protrusions 212 and/or bonding grooves or the inclined portion 214 formed in the second area defined on the lower surface of the feed head 210 to increase the contact area between the soldering layer 400 formed in the soldering process and the lower surface of the feed head 210, thereby further increasing the bonding strength compared to the conventional feed pin 140.

Cracks of the patch antenna 300 that occur during the electrical reliability test often occur between the lower surface of the feed head 210 and the patch antenna 300 (i.e., the upper surface of the upper patch 320). To prevent the cracks of the patch antenna 300, the bonding strength needs to be increased by increasing a contact area with the soldering layer 400 between the lower surface of the feed head 210 and the upper surface of the upper patch 320.

Referring to FIG. 13, in the patch antenna 100 to which the general feed pin 140 is applied, a small bonding space is formed only at an edge portion of the lower surface of the feed head 144. Since the patch antenna 100 to which the general feed pin 140 is applied has the small bonding space, the contact area between the soldering layer 150 and the patch antenna 100 is small, and thus the bonding strength is inevitably decreased.

Referring to FIG. 14, as a result of the electrical thermal impact test of the patch antenna 100 to which the general feed pin 140 is applied, the minimum strength is about 9 and the maximum strength is about 16. In this case, the average bonding strength is about 11.56. In this case, an electrical thermal impact test environment is repeated about 1000 times in a cycle that about +105° C. is maintained for about 30 minutes and then −40° C. is maintained for about 30 minutes.

Meanwhile, referring to FIG. 15, since the patch antenna 300 to which the feed pin 200 according to the embodiment of the present disclosure is applied has the first step S1 formed by the feed head 210 and the stepped plate 220, the bonding space B surrounded by the lower surface of the feed head 210, the outer perimeter of the stepped plate 220, and the upper surface of the upper patch 320.

In the patch antenna 300 to which the feed pin 200 according to the embodiment of the present disclosure is applied, the soldering layer 400 is formed in the bonding space B during the soldering process, and thus the contact area between the soldering layer 400 and the patch antenna 300 relatively increases, and the bonding strength between the lower surface of the feed head 210 and the patch antenna 300 is increased.

Referring to FIG. 16, as a result of the electrical thermal impact test of the patch antenna 300 to which the feed pin 200 according to the embodiment of the present disclosure is applied, the minimum strength is about 13 and the maximum strength is about 20. In this case, the average bonding strength is about 18.3. In this case, an electrical thermal impact test environment is repeated about 1000 times in a cycle that about +105° C. is maintained for about 30 minutes and then −40° C. is maintained for about 30 minutes.

Referring to FIG. 17, it can be seen that the patch antenna 300 to which the feed pin 200 according to the embodiment of the present disclosure is applied has no cracks between the lower surface of the feed pin 200 and the upper patch 320 even after the electrical reliability test.

As described above, since the feed pin 200 according to the embodiment of the present disclosure has the stepped plate 220 interposed between the lower surface of the feed head 210 and the upper surface of the feed bar 230, the patch antenna 300 to which the feed pin 200 is applied may be formed with the bonding space B surrounded by the lower surface of the feed head 210, the outer perimeter of the stepped plate 220, and the upper surface of the upper patch 320, thereby increasing the bonding strength of the feed pin 200.

The above description is merely the exemplary description of the technical spirit of the present disclosure, and those skilled in the art to which the present disclosure pertains will be able to variously modify and change the present disclosure without departing from the essential characteristics of the present disclosure. Therefore, the embodiments disclosed in the present disclosure are not intended to limit the technical spirit of the present disclosure, but intended to describe the same, and the scope of the technical spirit of the present disclosure is not limited by these embodiments. The scope of the present disclosure should be construed according to the appended claims, and all technical spirits within the equivalent range should be construed as being included in the scope of the present disclosure.

The invention claimed is:

1. A feed pin comprising:

a feed head made of a plate-shaped conductive material with a first area;

a stepped plate made of a plate-shaped conductive material having a second area and connected to a lower surface of the feed head; and a feed bar made of a polyhedral conductive material and connected to a lower surface of the stepped plate, wherein:

the second area is an area of a horizontal cross section of the stepped plate formed to be smaller than the first area that is a horizontal cross section of the feed head, a first step is formed between the feed head and the stepped plate, and the feed head defines a first region connected to the stepped plate and a second region that is an outer perimetric area of the first region, wherein an inclined portion having inclination closer to an upper surface of the feed head toward an outer perimeter of the feed head is formed in the second region, and wherein a first area connected to the feed bar and a second area that is an outer perimetric area of the first area are defined on a lower surface of the stepped plate, and a plurality of bonding protrusions are formed in the second area of the stepped plate.

2. The feed pin of claim 1, wherein the first step is formed along the lower surface of the feed head and outer perimeters of side surfaces of the stepped plate.

3. The feed pin of claim 1, wherein the stepped plate is formed by laminating a plurality of plate-shaped conductors formed to have different horizontal cross-sectional areas, and one or more steps are formed on side surfaces of the stepped plate.

4. The feed pin of claim 3, wherein a first step formed between the feed head and the stepped plate includes two or more steps.

5. The feed pin of claim 1, wherein a third area that is an area of a horizontal cross section of the feed bar is formed to be smaller than the second area that is a horizontal cross section of the stepped plate, and a second step is formed between the stepped plate and the feed bar.

6. The feed pin of claim 1, wherein the feed bar includes:

a first bar disposed on the lower surface of the stepped plate; and a second bar disposed on a lower surface of the first bar, and the second bar is formed to have a horizontal cross section smaller than a horizontal cross section of the first bar to form a locking stopper.

7. A patch antenna comprising:

a dielectric layer;

an upper patch disposed on an upper surface of the dielectric layer;

a lower patch disposed on a lower surface of the dielectric layer; and a feed pin passing through the upper patch, the dielectric layer, and the lower patch to feed the upper patch, wherein the feed pin includes:

a feed head made of a plate-shaped conductive material with a first area;

a stepped plate made of a plate-shaped conductive material having a second area and connected to a lower surface of the feed head; and a feed bar made of a polyhedral conductive material and connected to a lower surface of the stepped plate, wherein:

the second area is an area of a horizontal cross section of the stepped plate formed to be smaller than the first area that is a horizontal cross section of the feed head, a first step is formed between the feed head and the stepped plate, and the feed head defines a first region connected to the stepped plate and a second region that is an outer perimetric area of the first region, wherein an inclined portion having inclination closer to an upper surface of the feed head toward an outer perimeter of the feed head is formed in the second region, and wherein a first area connected to the feed bar and a second area that is an outer perimetric area of the first area are defined on a lower surface of the stepped plate, and a plurality of bonding protrusions are formed in the second area of the stepped plate.

8. The patch antenna of claim 7, wherein a bonding space surrounded by a lower surface of the feed head, an outer perimeter of the stepped plate, and an upper surface of the upper patch is defined, and a soldering layer is formed in the bonding space.

9. The patch antenna of claim 7, wherein an inclined portion having inclination closer to an upper surface of the feed head toward an outer perimeter of the feed head is formed in the second area, and a soldering layer is formed in a bonding space formed by the inclined portion and an upper surface of the upper patch.

10. The patch antenna of claim 7, further comprising: a first soldering layer formed in a bonding space surrounded by a lower surface of the feed head, an outer perimeter of the stepped plate, and an upper surface of the upper patch; and a second soldering layer formed in a bonding space formed by the upper surface of the upper patch and an outer perimeter of the feed head.

11. The patch antenna of claim 7, wherein the stepped plate is formed by laminating a plurality of plate-shaped conductors formed to have different horizontal cross-sectional areas, and one or more steps are formed on side surfaces of the stepped plate.

* * * * *